(12) United States Patent  
Otsuka

(10) Patent No.: US 8,208,562 B2  
(45) Date of Patent: Jun. 26, 2012

(54) TRANSCODING DEVICE, TRANSCODER, DECODER, AND TRANSCODING METHOD

(75) Inventor: Tatsushi Otsuka, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 1046 days.

(21) Appl. No.: 12/138,972

(22) Filed: Jun. 13, 2008

(65) Prior Publication Data  
US 2009/0190671 A1    Jul. 30, 2009

(30) Foreign Application Priority Data

Jun. 15, 2007  (JP) ................................. 2007-158953

(51) Int. Cl.  
*H04N 7/20* (2006.01)

(52) U.S. Cl. ................................................. 375/240.27

(58) Field of Classification Search .............. 375/240.27  
See application file for complete search history.

(56) References Cited

U.S. PATENT DOCUMENTS

| 7,848,408 B2 * | 12/2010 | Feng et al. ............... 375/240.03 |
| 2001/0053182 A1 | 12/2001 | Ishiyama |
| 2002/0114397 A1 * | 8/2002 | Todo et al. ............... 375/240.29 |
| 2003/0012284 A1 | 1/2003 | Kazayama et al. |
| 2005/0105625 A1 * | 5/2005 | Kim et al. ............... 375/240.27 |

FOREIGN PATENT DOCUMENTS

| JP | 2002-010261 | 1/2002 |
| JP | 2002-027465 | 1/2002 |
| JP | 2002-027465 A | 1/2002 |
| JP | 2003-116136 A | 4/2003 |
| WO | WO 95/28684 A1 | 10/1995 |
| WO | WO 02/51162 A1 | 6/2002 |

* cited by examiner

Primary Examiner — Chirag Shah  
Assistant Examiner — Jenkey Van  
(74) Attorney, Agent, or Firm — Fujitsu Patent Center

(57) ABSTRACT

A transcoding device has been disclosed, which reduces the influence of an error even if the error has occurred in a decode image before re-encoding (transcoding). The transcoding device includes a decoder that decodes image data encoded in a first format and a transcoder that re-encodes image data supplied from the decoder into a second format, wherein the decoder calculates and outputs an amount of decode errors at the time of decoding and a transcoder 3 outputs re-encoded image data as it is or outputs it after replacement with skip data.

7 Claims, 6 Drawing Sheets

"RELATED ART"

TRANSCODING DEVICE, TRANSCODER, DECODER, AND TRANSCODING METHOD

CROSS-REFERENCE TO THE RELATED APPLICATION

This application is based upon and claims the benefit of priority from prior Japanese Patent Application No. 2007-158953, filed on Jun. 15, 2007, the entire contents of which are incorporated herein by reference.

BACKGROUND

1. Field

Transition from analog broadcast to digital broadcast, such as BS digital broadcast, ground wave digital broadcast, is currently in progress.

The embodiments discussed herein are directed to a transcoding device, re-encoder (transcoder), decoder, and transcoding method, in which after encoded image data read from a digital broadcast signal or a storage device is decoded, it is re-encoded, which may include a re-encoding (transcoding) technique for reducing an error included in a decoded image.

2. Description of the Related Art

In a digital broadcast, a compression system that utilizes a correlation between images, such as MPEG2, is used as the motion image compression format. Currently, during a digital broadcast, data is transmitted at ten and some Mbs to twenty and some Mbs. A storage device, such as an HDD recorder, stores the digital data of the digital broadcast signal as is or stores it by re-encoding (transcoding) the image decoded so that the compression rate is increased after decoding the digital data of the digital broadcast signal, i.e., it stores it after reducing the amount of data by encoding again with a lower bit rate than the bit rate of the original image. Reduction in the amount of data leads to an increase in the length of recording time if an HDD recorder has the same capacity.

FIG. 1 is a diagram showing a configuration of such a transcoding device 1. As shown schematically, transcoding device 1 has a decoder 2 that receives and decodes an input data stream encoded in a first format and an encoder (transcoder) 3 that re-encodes (transcodes) data decoded by decoder 2 into a second format and outputs an output data stream. The first encoding format and the second encoding format may be any format, respectively. However, MPEG2 is widely used for the first encoding format and H.264 for the second encoding format, etc. There may be a case where the first and second encoding formats are both MPEG2 and data is transcoded so that the compression rate is increased.

There may be a case where the entire transcoding device 1 in FIG. 1 is put into an LSI, or a case where decoder 2 and encoder (transcoder) 3 are constituted by different LSIs, respectively, or a case where a primary storage device, such as DRAM, is added.

If the amount of data is reduced, the quality of the image degrades; however, an attempt has been made to make the degradation less remarkable by reducing the image size or processing to dull the edge of the image by filtering before re-encoding the decoded image. However, the degradation of the image and length of recording time is a tradeoff.

A transcoding device is described in the following documents.

WO95/2868A describes a device that transcodes a received video stream with a fixed bit rate into a variable bit stream and also hides errors.

JP2002-10261A2 (US2001053182A1) describes that a transcoder control part, which monitors a decoder, controls a transcoder, and controls an encoder, controls an amount of operations of a rate control part and a motion guarantee prediction part so that the amount of code in a buffer and the total number of operations are constant in accordance with the amount of code in the buffer and the amount of operations per unit block.

JP2002-27465A2 describes that a VOP (video object plane) target code amount calculation part which calculates an amount of target code of a VOP is provided and an MPEG4 image information encoding part (I/P-VOP) controls the amount of code in accordance with the amount of target code when encoding image information into MPEG4 image compression information (bit stream).

SUMMARY

In order to achieve the above object, the present embodiment is characterized in that the amount of errors of a decoded image is calculated and an erroneous image is excluded from those to be re-encoded (transcoded) in accordance with the amount of errors. Due to this, it is possible to prevent wasted data.

However, if all of the images with an error are excluded, an image with a slight error is also excluded and the image becomes difficult to view. In order to avoid such a case, after an image is re-encoded, it is determined whether to exclude the image and if so the image is replaced with skip data.

The skip data is an instruction to copy 100% of a reference image prior to the image and therefore the amount of skip data is very small.

The number of errors are calculated by taking into consideration both the number of error macro blocks of a decoded image and the amount of errors (number of error macro blocks) of a reference image to be used when decoding.

The determination whether to exclude or not is made based on the number of decode errors, the target amount of data of re-encoding processing, and the amount of data of the re-encoded image. Specifically, when a difference between the target amount of data and the amount of data of the re-encoded image is greater than a first threshold value and the amount of decode errors is greater than a second threshold value, it is determined to replace the image with skip data.

In the present embodiment, re-encoding (transcoding) is carried out in real time for the image data supplied from the decoder.

According to the present embodiment, it is possible to prevent the entire image quality from being degraded after re-encoding compared to conventional encoding (transcoding) because the amount of data is not consumed wastefully for playing back an image degraded due to an error.

BRIEF DESCRIPTION OF THE DRAWINGS

The features and advantages will be more clearly understood from the following description taken in conjunction with accompanying drawings, in which.

DESCRIPTION OF THE PREFERRED EMBODIMENTS

Figure 1:
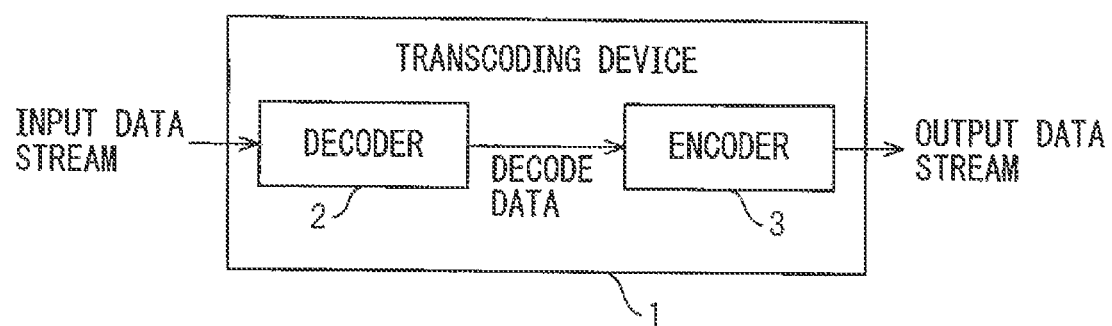
FIG. 1 is a diagram showing a configuration of a transcoder device.

During re-encoding the MPEG2 format or the H.264 (MPEG4/AVC) format the compression rate of which is higher than that of the MPEG2 format is used, and in each a high compression rate is realized by utilizing the high correlation in a natural image between images or between pixels in an image. Generally during encoding of an image, in which re-encoding is also included, a reference image is determined and the difference is put into data and when image data is decoded, decoding is carried out on the basis of the reference image.

It is not possible to avoid erroneous data due to a communication error, etc., in broadcast waves. In this case, it is a matter of course that the degradation of an image in which an error of data has occurred is unavoidable and if the image is selected as a reference image for other images, the degradation will affect other images. Normally, in order to prevent the error from continuing to affect other images, an I-pic (prediction in a screen) is inserted periodically; however, in either case, images degraded by errors will continue for a certain period of time.

For normal viewing of an image being played back, even if there is an image degraded by an error, no problems will occur, except that the image will be difficult to view, and is also a serious problem for transcoding.

The degree of degradation of an image due to an error depends on the erroneous portion in a data stream, the amount of errors, the implementation method of a decoder circuit, etc. However, in most cases, an extremely different image will be produced, resulting unnatural looking images.

Because of this, when the degradation of an image due to an error occurs, an artificial image, never found in natural images, is produced, which not only lacks the correlation between pixels or between images, but also makes its edges conspicuous. If the degraded image is re-encoded into the MPEG2 or H.264 (MPEG4/AVC) format, the correlation between pixels or screens for a normal image cannot be achieved and the image becomes an image in which edges due to unsmooth changes are conspicuous, and therefore, the compression effect is not effective and thus the compression rate is degraded considerably. In some cases, the amount of data may become greater than that of the original data stream.

Further, if the amount of errors is not so great that the image can be viewed at a certain level, effective compression can be obtained. However, effective compression cannot be obtained if an image has too many errors. Because such an image consumes a large amount of data, the amount of data required for re-encoding an image with no error or with few errors, is excessive. Such a large amount of data should be allocated to an image having no errors or only a few errors, otherwise, the image quality of the transcoded image is degraded considerably.

An embodiment will solve these problems and an object thereof is to realize a transcoding device, re-encoder (transcoder), decoder, and transcoding method that reduces the influence of an error even if the error has occurred in a decoded image before re-encoding (transcoding).

Figure 2:
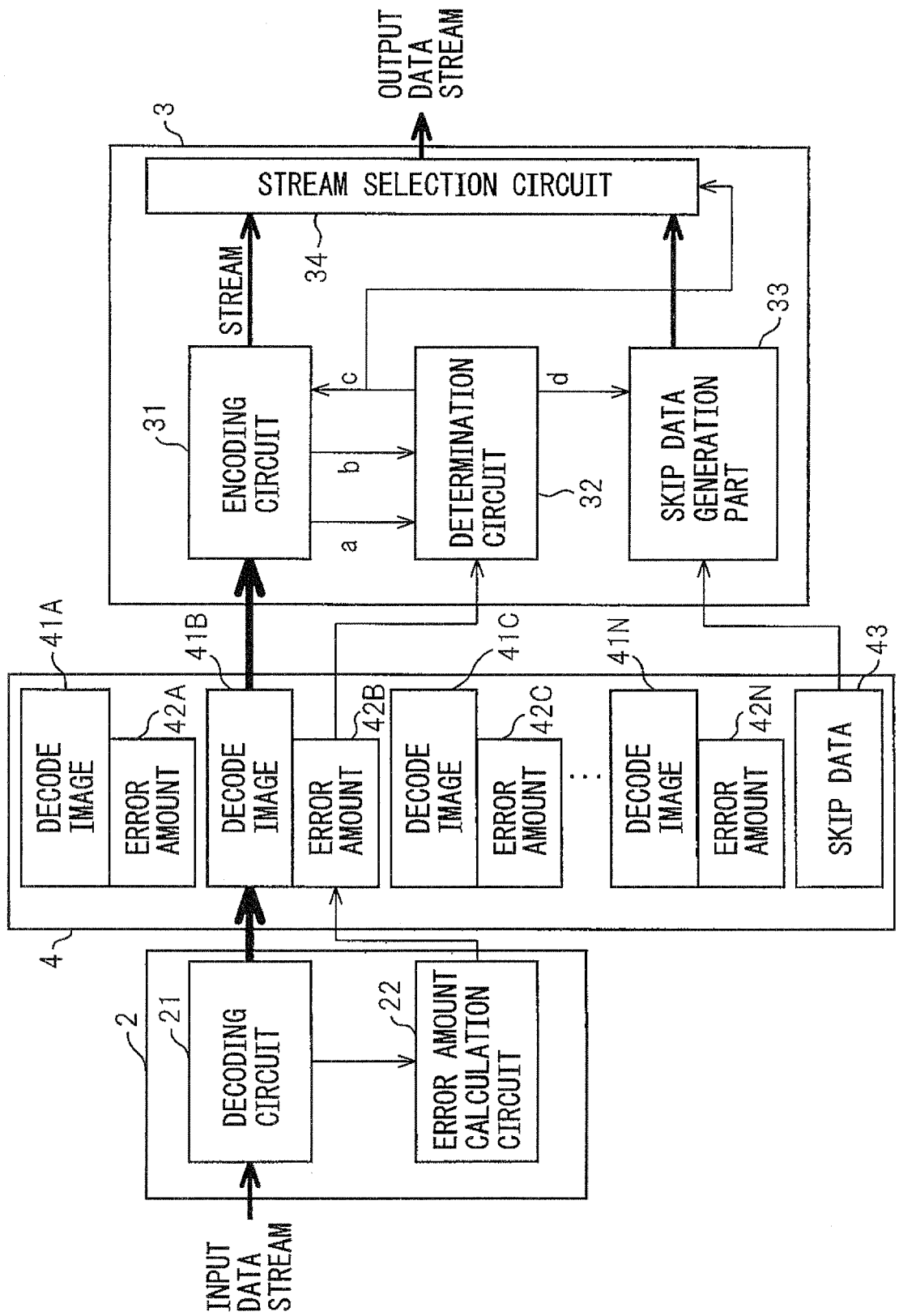
FIG. 2 is a diagram showing a configuration of a transcoder device in an embodiment.

FIG. 2 is a diagram showing a configuration of a transcoder device in an embodiment. As shown schematically, the transcoder device in the embodiment has decoder 2, re-encoder (transcoder) 3, and a frame memory 4. In the transcoder device in the embodiment, re-encoder (transcoder) 3 re-encodes (transcodes) the decode image output from decoder 2 in real time.

Decoder 2 and re-encoder (transcoder) 3 are realized using an LSI, respectively, and frame memory 4 is realized using a DRAM. However, it is also possible to realize decoder 2 and re-encoder (transcoder) 3 using one LSI and further realize DRAM constituting frame memory 4, using one LSI.

Decoder 2 has a decoding circuit 21 that receives an input data stream encoded in the first format to generates a decode image and outputs it to decode image storage parts 41A-41N in frame memory 4 and an error amount calculation circuit 22 that calculates the amount of errors of decoding in decoding circuit 21 and outputs it to error amount storage parts 42A-42N in frame memory 4 by associating it with the decode image.

Re-encoder (transcoder) 3 has an encoding circuit 31 that re-encodes (transcodes) a decode image in accordance with the target amount of data and outputs it together with the target amount of data and the actual amount of data, a determination circuit 32 that determines whether to use an image (stream) generated by encoding circuit 31 or to replace it with skip data based on the amount of errors corresponding to the decode image, the target amount of data from the encoding circuit 31 and the actual amount of data, a skip data generation part 33 that generates skip data, and a stream selection circuit 34 that selects either the image (stream) output from encoding circuit 31 or the skip data output from skip data generation part 33 based on the determination result of determination circuit 32 and outputs it as an output data stream.

Frame memory 4 has decode image storage parts 41A-41N, error amount storage parts 42A-42N, and a skip data storage part 43 that stores a reference image. The respective sets of decode image storage parts 41A-41N and error amount storage parts 42A-42N corresponding to each other store the respective sets of the decode images and the amounts of errors corresponding to each other.

Normally, the MPEG2 format and the H.264 format include streams different from each another in the terms encoding processing, such as I-pic, P-pic, B-pic, etc., and desired skip data is also different. Because of this, it is desirable for skip data generation part 33 to generate skip data in accordance with these requirements. In the present embodiment, the configuration is such that skip data in accordance with each data type is prepared in advance in skip data storage part 43 in frame memory 4 and skip data generation part 33 reads this and outputs it to stream selection circuit 34. The skip data refers to data that instructs to copy 100% of the reference image prior to the image.

Next, the error amount calculation processing in error amount calculation circuit 22 is explained with reference to FIG. 3.

As described above, generally during encoding processing of an image, a reference image is determined and the difference from the reference image is put into data and when the image data is decoded, processing of decoding is carried out on the basis of the reference image. The amount of errors is calculated by taking into consideration both the number of error macro blocks when decoding an input stream and the amount of errors of the reference image used when decoding.

If the number of error macro blocks becomes inconsistent in the syntax defined by the specifications of MPEG2 and H.264 when decoding an input stream of MPEG2 or H.264, it is regarded that there is an error in the macro block. Further, if determined to be an error, all of the macro blocks until recovery from the error, such as synchronized code called a slice header, are counted as erroneous ones.

However, depending on how an error has occurred, there may be a case where there is no inconsistency in the syntax, and in such a case, there is the possibility that the error is overlooked. However, it rarely happens that such inconsistency does not appear to the last in the variable length encoding format, such as MPEG2, H.264, etc. In addition, in the present embodiment, it is not necessary to determine the accurate amount of errors, and therefore, there no problems will occur by determing such an amount of errors.

In this manner, the number of error macro blocks is calculated.

It is also possible to calculate the number of error macro blocks by subtracting the number of macro blocks that can be regarded to be decoded normally from the total number of macro blocks.

Figure 3:
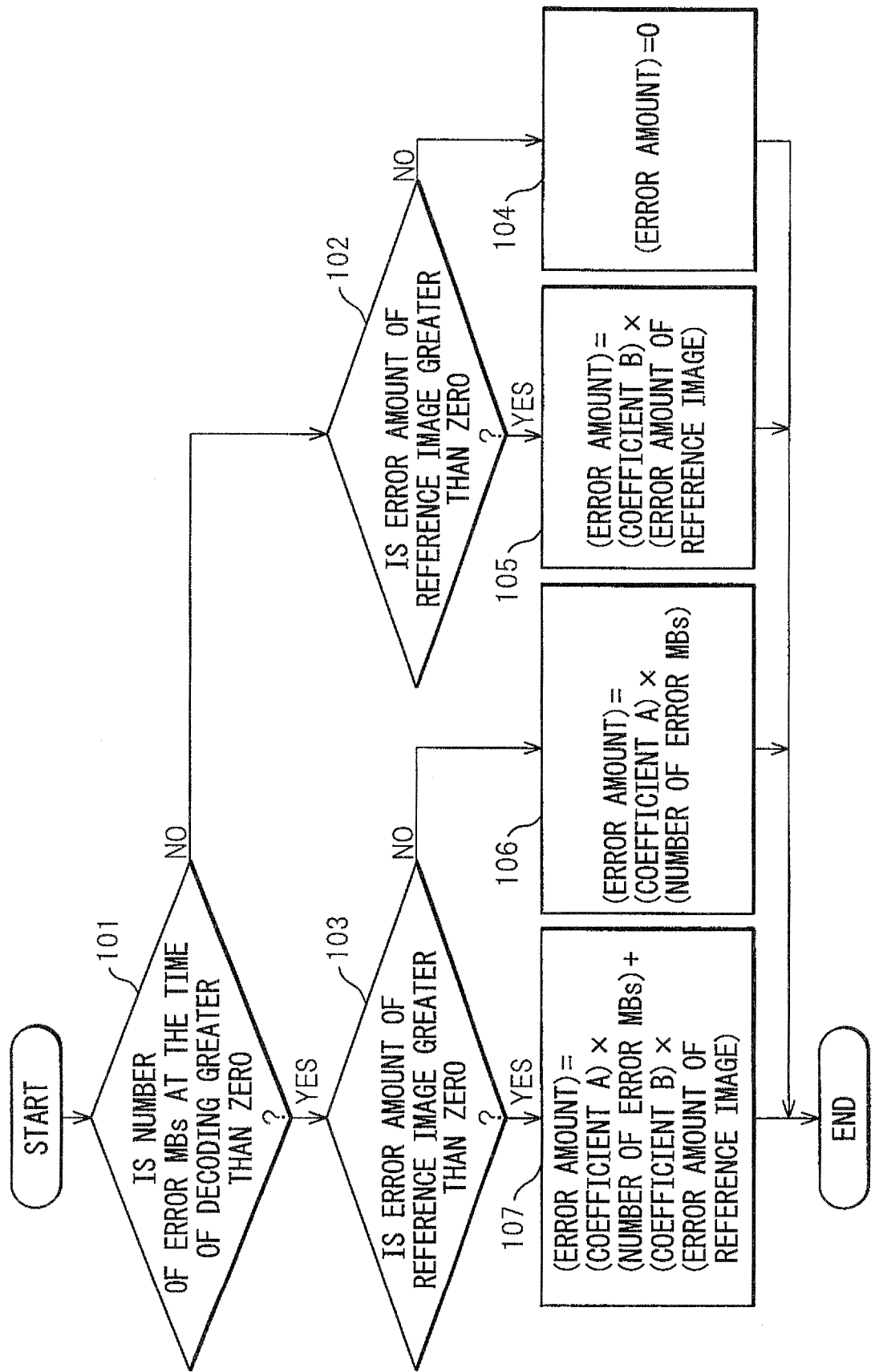
FIG. 3 is an error amount calculation flow in an error amount calculation circuit in an embodiment.

After the number of error macro blocks is calculated, the amount of errors is calculated in accordance with the error amount calculation processing flow in FIG. 3 using a coefficient A that converts the number of error macro blocks into an amount of errors and a coefficient B that converts the amount of errors of the reference image.

In step 101, whether the number of error macro blocks (MB) of decoding is larger than zero is determined and if zero, the procedure proceeds to step 102 and if larger than zero, the procedure proceeds to step 103.

In step 102, whether the amount of errors of the reference image is larger than zero is determined and if zero, the procedure proceeds to step 104 and if larger than zero, the procedure proceeds to step 105.

In step 104, the amount of errors is set to zero (amount of errors=0).

In step 105, the amount of errors is set to coefficient B multiplied by the amount of errors of the reference image (the amount of errors=coefficient B×(amount of errors of reference image)).

In step 103, whether the amount of errors of the reference image is greater than zero is determined and if zero, the procedure proceeds to step 106 and if greater than zero, the procedure proceeds to step 107.

In step 106, the amount of errors is set to coefficient A multiplied by the number of error macro blocks (MB) (amount of errors=coefficient A×number of error blocks (MB)).

In step 107, the amount of errors is set to coefficient A multiplied by the number of error macro blocks (MB) plus coefficient B multiplied by the (amount of errors of the reference image) (amount of errors=coefficient A×number of error macro blocks (MB)+coefficient B×(amount of errors of reference image)).

Coefficients A and B are coefficients provided for convenience in order to represent the degradation of an image owing to errors by a numerical value and their values are set appropriately in accordance with the actual processing contents.

In the present embodiment, simple linear expressions are used. However, the human visual characteristics are not necessarily linear, and therefore, nonlinear expressions may be used.

In either case, what is required is that the amount of errors of a decode image can be represented in any form of a numerical value.

Figure 4:
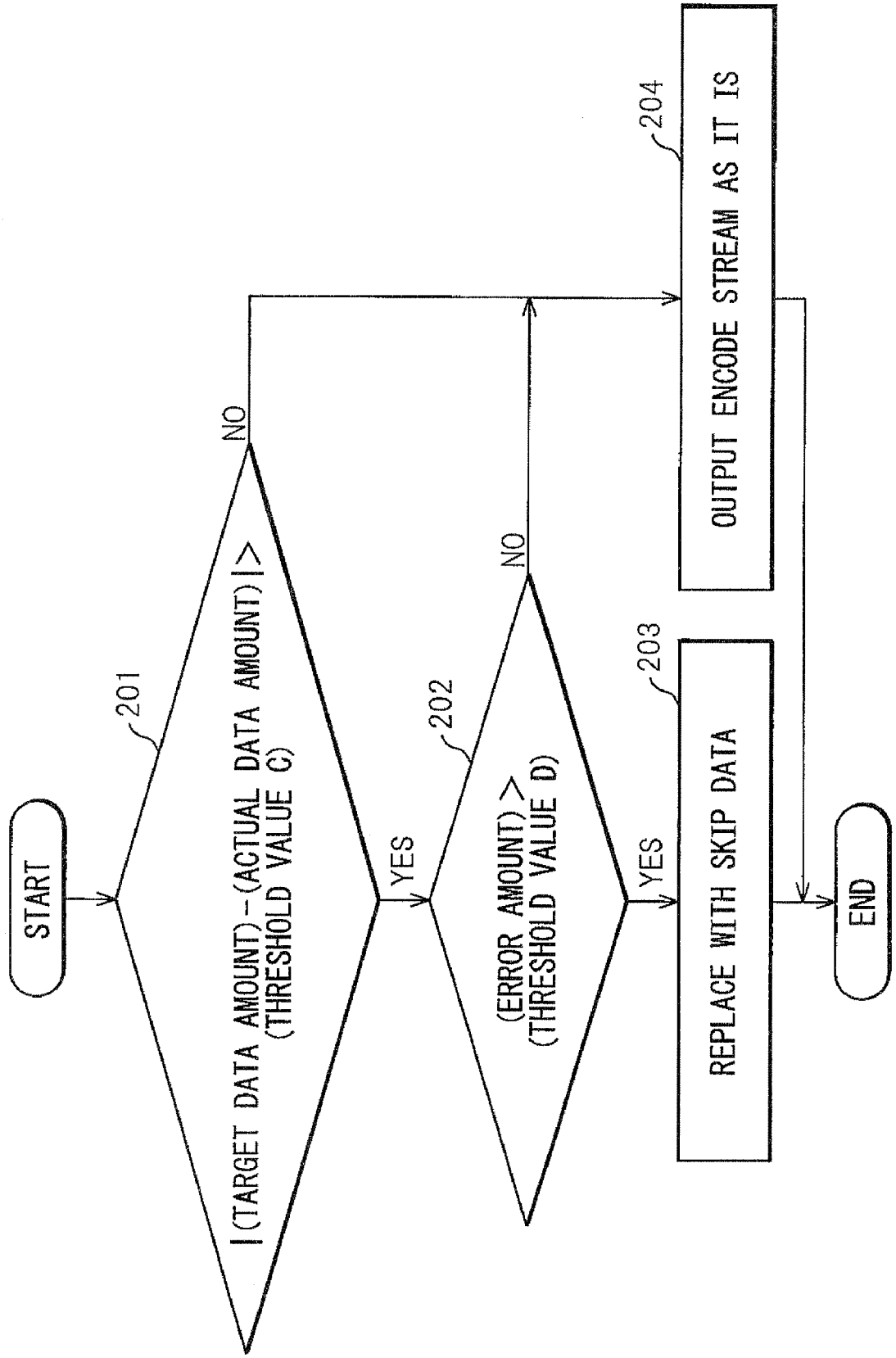
FIG. 4 is a determination processing flow in a determination circuit in an embodiment, a diagram for explaining a processing example in an embodiment.

FIG. 4 shows a determination processing flow in determination circuit 32.

Encoding circuit 31 encodes a decode image so that it has an amount of data equal to or less than the target amount of data and outputs the actual amount of encoded data to determination circuit 32 together with the target amount of data.

Determination circuit 32 determines whether the absolute value of the difference between the target amount of data and the actual amount of data is greater than a predetermined threshold value C in step S201 and if greater than threshold value C, the procedure proceeds to step 202 and if not, the procedure proceeds to step 204.

In step 202, it is determined whether the amount of errors calculated in the processing in FIG. 3 is greater than a predetermined threshold value D and if greater than threshold value C, the procedure proceeds to step 203 and if not, the procedure proceeds to step 204.

In step 203, the stream selection circuit selects step data and switches to output it as an output data stream. In step 204, the stream selection circuit switches to output an image, which is obtained by re-encoding the decode image, with no change as an output data stream.

When a stream replaced with skip data is decoded, an unnatural image is obtained because the image stops for an instant or it seems to flow backward. However, skip data is just data to instruct to copy 100% of the previous reference image and the amount of data is therefore very small. Accordingly, it is much more recommended to use it than spend a wasteful amount of data in order to reproduce an image degraded owing to an error.

Figure 5:
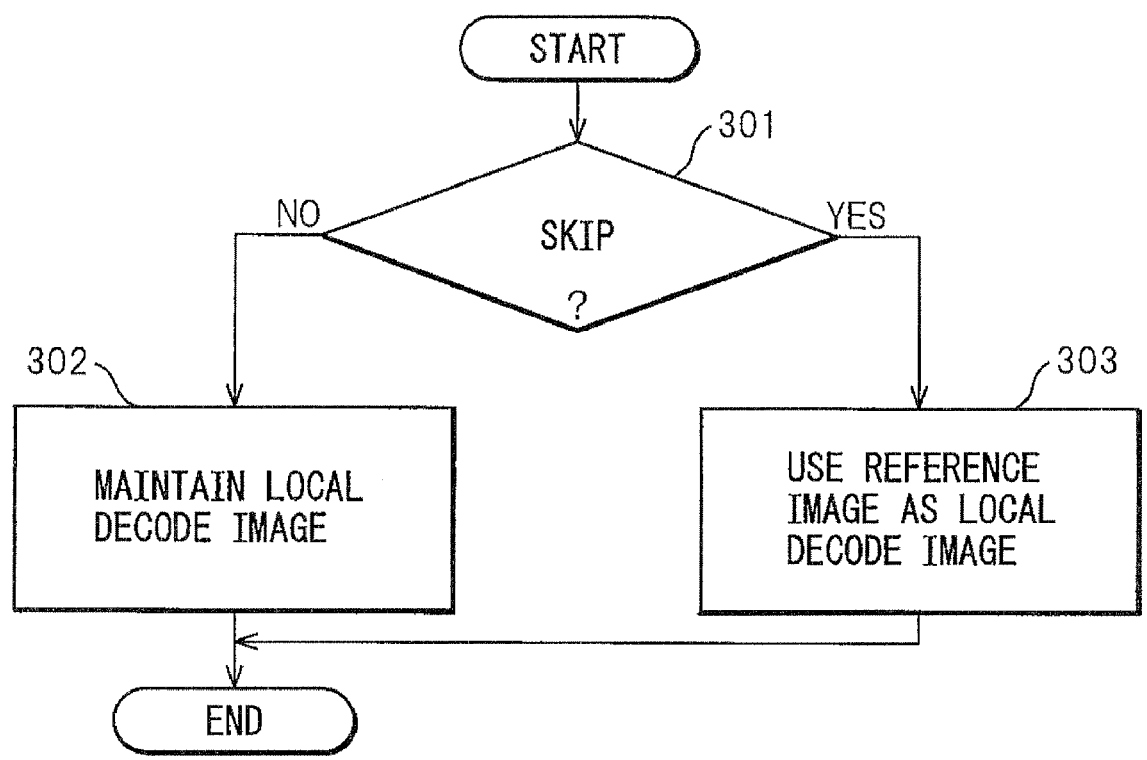
FIG. 5 is a local decode image replacement processing flow in an encoding circuit in an embodiment.

FIG. 5 is a local decode image replacement processing flow performed by encoding circuit 31 based on the determination result from determination circuit 32.

Encoding circuit 32 receives the determination result from determination circuit 32 and determines whether to replace the output stream with skip data in step 301, and if not replaced, the procedure proceeds to step 302 and if replaced, the procedure proceeds to step 303.

In step 302, the local decode image that encode circuit 31 has is maintained as is.

In step 303, the local decode image that encoder circuit 31 has is discarded and the reference image is used as the local decode image.

Figure 6A:
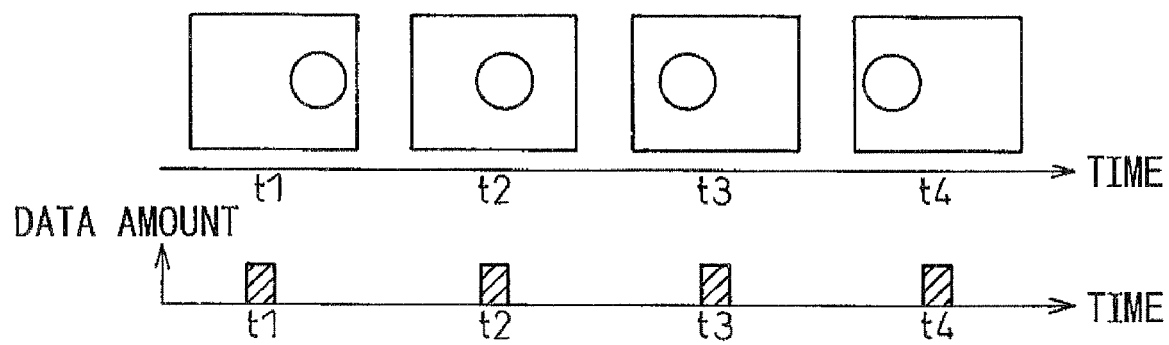
FIG. 6A to FIG. 6C are diagrams explaining the change of the image and the amount of data in an embodiment.
Figure 6B:
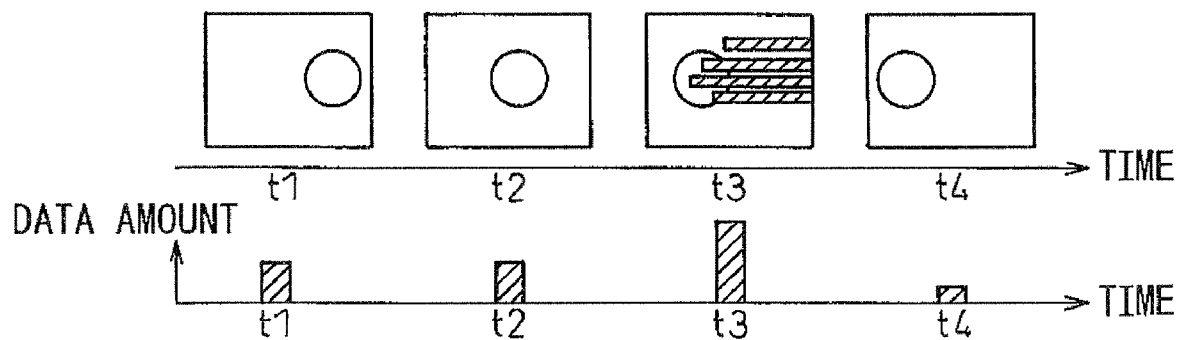
Figure 6C:
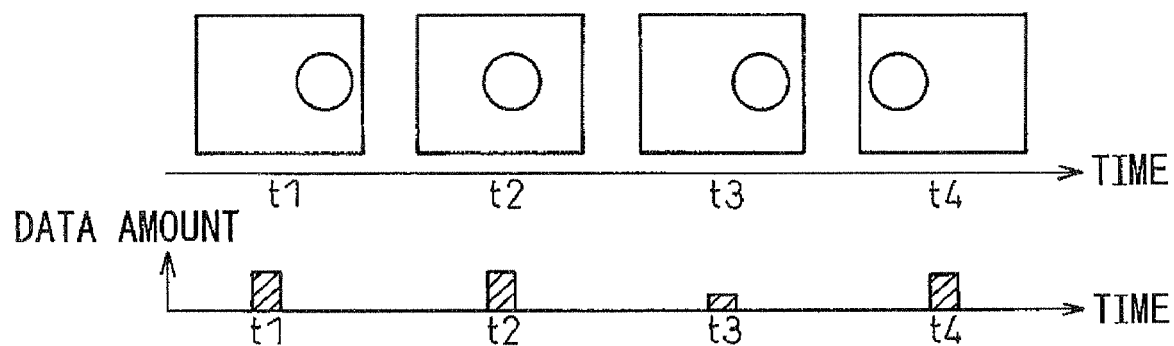

FIG. 6A to FIG. 6C are diagrams for explaining the change of the image and the amount of data in the embodiment, where FIG. 6A shows a case without an error, FIG. 6B shows a case where an error has occurred at time t3 and encoding is carried out by the conventional method, and FIG. 6C shows a case in the present embodiment where the data at time t3 has been replaced with skip data, which will serve as a reference image.

In FIG. 6A, the rectangle on the upper side represents each image in the direction of time, representing a motion image in which a circular object moves from left to right in the upper part of the screen. The bar graph on the lower side represents the amount of data of each screen and if there is no error, the amount of data of each screen is substantially the same. Originally, the amount of data differs depending on the type, such as, I-pic, P-pic, B-pic, etc. However, here it is assumed that the amount of data is the same for simplification of explanation.

As shown in FIG. 6B, when an error has occurred at time t3 and encoding is carried out by the conventional method, the degradation of the image appears at t3 owing to the error and at the same time, the amount of data is increased in order to reproduce the degraded image. Furthermore, because the amount of data at t3 increases, it is necessary to suppress the total amount of data and therefore the amount of data at t4 is reduced. Owing to this, the image at t4 is more degraded compared to that in FIG. 6A etc.

As shown in FIG. 6C, when an error has occurred at time t3, in the present embodiment, determination circuit 32 determines to replace the image at t3 with skip data. In accordance with this, the data at t3 is replaced with the image at time t1 because it is the reference image, and therefore, the image at time 3 is the same as the image at time t1. If these images are seen in a motion image, the circular object returns back to the right for an instant at time t3. Because of this, the motion image is somewhat unnatural. However, the image is not difficult to view because there is no turbulence, such as that in the image in FIG. 6B, and the amount of data at t3 in FIG. 6C is very small because of skip data, and therefore, it is possible to prevent the amount of data at t4 from decreasing because a wasteful amount of data is not used.

The embodiments are described above. However, it is obvious that the present embodiment is not limited to those and there can be various modification examples of the calculation method of amount of data, the determination method of replacement, etc.

The present embodiment can be applied to any configuration in which after encoded image data is decoded, it is re-encoded (transcoded) and can also be applied to a decoder and an re-encoder (transcoder) for that.

I claim:

1. A transcoding device comprising:
a decoder that decodes image data encoded in a first format; and
a transcoder that re-encodes image data supplied from the decoder into a second format, wherein:
the decoder calculates a sum as an amount of decode errors and outputs the amount of decode errors at the time of decoding, the sum being of a value, which is the number of error macro blocks of the image obtained by decoding the image data encoded in the first format multiplied by a first coefficient, and another value, which is an amount of errors of a reference image multiplied by a second coefficient; and
the transcoder outputs the re-encoded image data as it is or outputs after replacing the re-encoded image data with skip data based on the amount of decode errors and information at the re-encoding.

2. The transcoding device according to claim 1, wherein the transcoder comprises:
an encoding circuit that re-encodes the image data supplied from the decoder so that the amount of data of the re-encoded image is equal to or less than a target amount of data and at the same time, calculates the amount of data of the re-encoded image and outputs the amount of data of the re-encoded image together with the target amount of data; and
a determination circuit that determines whether to output the re-encoded image data as it is or to output after replacing the re-encoded image data with stored skip data based on the amount of decode errors, the target amount of data, and the amount data of the re-encoded image.

3. The transcoding device according to claim 2, wherein the determination circuit determines to output after the replacement with the skip data when the difference between the target amount of data and the amount of data of the re-encoded image is greater than a first threshold value and the amount of decode errors is greater than a second threshold value.

4. The transcoding device according to claim 1, wherein the transcoder re-encodes the image data supplied from the decoder in real time.

5. A transcoder that re-encodes image data supplied from a decoder, comprising:
an encoding circuit that re-encodes the image data supplied from the decoder so that the amount of data of the re-encoded image is equal to or less than a target amount of data and at the same time, calculates the amount of data of the re-encoded image and outputs the amount of data of the re-encoded image together with the target amount of data; and
a determination circuit that determines whether to output the re-encoded image data as it is or to output after replacing the amount of data of the re-encoded image with stored skip data based on the amount of decode errors, the target amount of data, and the amount of data of the re-encoded image, wherein
the determination circuit determines to output after the replacement with the skip data when the difference between the target amount of data and the amount data of the re-encoded image is greater than a first threshold value and the amount of decode errors is greater than a second threshold value.

6. A decoder, comprising:
a decoding circuit that decodes encoded image data; and
an error amount calculation circuit that calculates and outputs an amount of decode errors at the time of decoding to a transcoder for re-encoding the image data with skip data based on the amount of decode errors, wherein
the error amount calculation circuit calculates a sum as an amount of errors, the sum being of a value, which is the number of error macro blocks of the image obtained by decoding the encoded image data multiplied by a first coefficient, and another value, which is an amount of errors of a reference image multiplied by a second coefficient.

7. A transcoding method, comprising:
decoding image data encoded by a first format;
calculating an amount of decode errors at the time of decoding;
re-encoding decoded image data into a second format; and
determining whether to output re-encoded image data as it is or to output after the replacement with skip data based on the amount of decode errors and information at the time of re-encoding, wherein
a sum being calculated as the amount of decode errors, the sum being of a value, which is the number of error macro blocks of the image obtained by decoding the image data encoded in the first format multiplied by a first coefficient, and another value, which is an amount of errors of a reference image multiplied by a second coefficient.

* * * * *